United States Patent Office 3,451,801
Patented June 24, 1969

3,451,801
CATIONIC POLYMERS
Fred N. Teumac, Lake Jackson, Tex., assignor to The Dow Chemical Company, Midland, Mich., a corporation of Delaware
No Drawing. Filed Aug. 23, 1965, Ser. No. 481,942
Int. Cl. A01n *11/04, 17/10*
U.S. Cl. 71—66         12 Claims

ABSTRACT OF THE DISCLOSURE

New cationic polymer compositions are prepared in the reaction between a divalent sulfur-containing diamine and an ethylenedihalide. The polymers thus formed are terminated by amino groups, halogen, or a mixture of amino groups and halogen. The new cationic polymers are chelating agents for polyvalent metal ions.

---

This invention is directed to new cationic polymer compositions useful as chelating agents. More specifically, the invention concerns new polymers useful in complexing polyvalent metal ions and their preparation.

This invention is further directed to methods of preparing new cationic polymers and to complexes between such polymers and polyvalent metal ions.

The novel cationic polymers of the present invention are ones which, except for the terminating groups not indicated therein, have the empirical formula:

(—CH$_2$—CH$_2$—)$_m$·(—NH—CH$_2$
            —CH$_2$—S—CH$_2$—NH—)$_n$ wherein *m* is an integer of from 1 to 3 and *n* is an integer of from 2 to 4.

Cationic polymers such as polyethyleneimine and polyalkylenepolyamines are old in the art. They are useful both as flocculating agents, and to a lesser degree, as chelating agents. The polymers of the present invention lack the flocculating properties of polyethyleneimine and the polyalkylenepolyamines and are better chelating agents due to the inclusion of bivalent sulfur in the molecule.

The reaction between bis(2-aminoethyl)sulfide and ethylenedichloride is typical of the method for making the products of the invention:

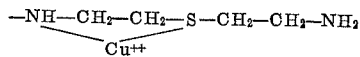

sitions. N-(2-(2-aminoethylthio)ethyl)ethylenediamine is the subject matter of copending application Ser. No. 463,919, filed June 14, 1965, now U.S. Patent 3,362,996, issued Jan. 9, 1968.

Other divalent sulfur-containing diamines, such as 1,8-diamino - 3,6-dithiaoctane, 1,9-diamino-3,6-dithianonane, 1,10 - diamino-3,7-dithiadecane, bis(aminophenyl)sulfide, and bis(aminotolyl)sulfide, and other ethylenedihalides, such as (CH$_2$)$_2$Br$_2$, (CH$_2$)$_2$I$_2$, (CH$_2$)$_2$ClBr$_2$, (CH$_2$)$_2$ClI, and (CH$_2$)$_2$BrI, can be used to produce polymers according to this invention. Suitable divalent sulfur-containing diamines are disclosed in Reid, Organic Chemistry of Bivalent Sulfur, Vol. II (New York, Chemical Publishing Co., 1960), especially at page 295. The examples provided herein produce polymers that are the best for chelation because their configuration allows the formation of stable five-membered rings with the metal ions:

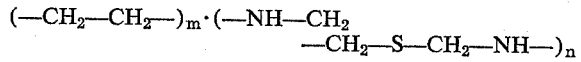

Different configurations tend to produce less efficient chelates if they do not form five-membered rings with the metal ions.

The polymeric products produced according to this invention are either pale white or amber viscous liquids. Their infrared spectra are characteristic for salts of amines and all show primary and secondary nitrogen bonds. The products all turn dark blue in the presence of copper and its salts, indicating the formation of a complex with copper.

The following examples illustrate the most desirable embodiments of the invention without any intention to limit the scope of the invention thereto. In practice, the syntheses set forth in these examples are carried out in a flask equipped with stirring means, a thermometer and a reflux condenser. The flask is heated by standard means, for example, a heating mantle. Separation of the reacted product from excess reactant is carried out by conventional means, such as a separatory funnel. Excess of either reactant may be distilled out of the product after completion of the reaction. Lesser than equimolal ratios of ethylenedichloride give unreacted terminal NH$_2$ groups, however. The term "reacting," as used herein, means that the specific reactants are combined and heated to a temperature sufficient to initiate an exothermic

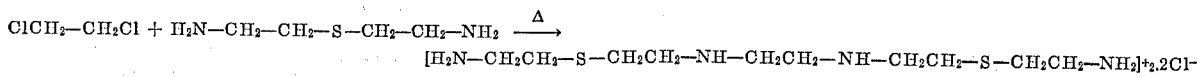

The chloride salt form above may be neutralized by the addition of a stronger base.

The cationic polymers of this invention can be prepared as the reaction products of a divalent sulfur-containing diamine and an ethylenedihalide, where the halogens are chlorine, bromine, or iodine. The polymer chains will be terminated by NH$_2$ groups at both ends, or halogen groups at both ends, or an NH$_2$ at one end and a halogen at the other, depending on the relative amount of the divalent sulfur-containing diamine and the organic dihalide that are reacted. Equimolar amounts of the reactants tend to give an NH$_2$ at one end and a halogen at the other. An excess of the divalent sulfur-containing diamine tends to give an NH$_2$ group at both ends. An excess of the ethylenedihalide tends to give a halogen at both ends. In practice, for example, bis(2-aminoethyl)sulfide or N-(2-(2-aminoethylthio)ethyl) ethylenediamine is reacted with ethylenedichloride in substantially equimolar proportions to produce the polymeric comporeaction. This exothermic reaction is allowed to continue until it subsides. In the case of thioethylamine and ethylenedichloride, a temperature of about 80°–85° C. is necessary to initiate the reaction.

Example 1

60 grams (0.5 mole) of bis(2-aminoethyl)sulfide and 55 grams (0.5 mole) of ethylenedichloride are combined and stirred at room temperature. No reaction ensues. The flask is then heated to 83° C., resulting in a vigorous exothermic reaction. A temperature sufficient to break a 160° C. thermometer is produced. The peak temperature is estimated to be 200°–250° C. After the exotherm subsides, most of the product is contained in the reactor system. An analysis of this product is shown below in Table I as polymer product 1.

Example 2

60 grams of bis(2-aminoethyl)sulfide and 55 grams of ethylenedichloride are mixed with 60 grams of H$_2$O. No reaction occurs until a temperature of about 85° C. is reached. A less vigorous reaction than in Example 1 occurs. The reaction is allowed to continue until the exotherm subsides. The resulting product is reported as polymer product 2 in Table 1.

Example 3

60 grams of ethylenedichloride is heated to 80° C. and 55 grams of bis(2-aminoethyl)sulfide is added slowly. An exothermic reaction similar to that in Examples 1 and 2 occurs, but the temperature is maintained in this way at 88° C. or less. The product of reaction is referred to as polymer product 3 below.

Example 4

5.5 grams of ethylenedichloride and 8.2 grams of N-(2-(2-aminoethylthio)ethyl) ethylenediamine

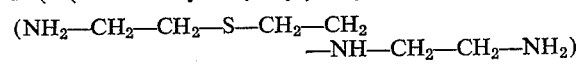

are mixed together and heated to 80° C., giving an exothermic reaction to produce polymer product 4.

Example 5

Excess ethylenedichloride (155 grams) and bis(2-aminoethyl) sulfide are mixed together and heated, producing a vigorous reaction which is controlled by refluxing ethylenedichloride. When the exotherm subsides, unreacted ethylenedichloride is distilled from the flask, leaving polymer product 5.

The yields of Examples 1–5 were substantially 100 percent considering the entire reacted product as the cationic polymer of this invention. Table I shows the molecular weight and elemental analyses of polymers produced according to the first three examples. These molecular weights and elemental analyses indicate that the products are not pure adducts, but are polymeric compounds. Similar results are obtained using other ethylenedihalides, for example, $(CH_2)_2Br_2$, $(CH_2)_2I_2$, $(CH_2)_2ClBr$, $(CH_2)_2ClI$, and $(CH_2)_2BrI$.

TABLE I

| Polymer product | Molecular wt. | Percent N | Percent S |
|---|---|---|---|
| 1 | 218 | 15.81 | 17.7 |
| 2 | 530 | 15.15 | 16.7 |
| 3 | 254 | 15.42 | 16.9 |

Water-soluble polyvalent metal ion complexes can be produced with the cationic polymers of the present invention. For example, a copper ion complex useful for inhibiting biological growth in aquatic bodies can be formed from copper salts and the polymers of this invention. A copper ion treating solution, in accordance with the present invention, is easily and simply prepared by dissolving a water-soluble copper salt, for example, copper sulfate, in an aqueous or bulk solution of one of the cationic polymers of the present invention at a copper: polymer weight ratio of from about 3:1 to 1:3 and adding this solution to the body of water to be treated in an amount sufficient to establish a copper concentration of from about 2 to 3 p.p.m.

Similar complexes prepared from polyethyleneimine and water-soluble copper salts are effective in treating alkaline water when the water lacks suspended solids or turbidity or one desires to destroy algae. However, there are situations where the water is turbid and it is desired to destroy moss and plants other than algae. Under these conditions, polyethyleneimine-copper complexes are ineffective as treating agents because they form floucculates with the suspended solids, and the copper is associated primarily with the resulting sediment. Complexes formed according to the present invention, on the other hand, are effective in treating both algae and other undesirable biological material in turbid, alkaline water. The copper concentration in solution remains at effective levels under such conditions. Tables 2 and 3 compare the resulting copper concentration levels of the polyethyleneimine-copper complex and the copper complex of the present invention. The polymers and copper salt, in the form of copper sulfate, are added to alkaline (pH 8 to 9), turbid water from Lake Jackson, Texas in the proportions indicated, based on the weight of water.

TABLE II

| Material added (p.p.m.) | | Resulting $Cu^{++}$ Concentration in water solution (p.p.m.) |
|---|---|---|
| PEI | $Cu^{++}$ | |
| 1.0 | 2.6 | 0.3 |
| 2.0 | 1.3 | 0.2 |
| 0.8 | 0.5 | <0.2 |
| 1.3 | 2.0 | 0.2 |

TABLE III

| Polymer product No. | Material added (p.p.m.) | | Resulting $Cu^{++}$ concentration in water solution (p.p.m.) |
|---|---|---|---|
| | Amount | $Cu^{++}$ | |
| 1 | 1.0 | 2.0 | 1.0 |
| 1 | 3.0 | 2.0 | 1.3 |
| 2 | 1.0 | 2.0 | 1.2 |
| 2 | 3.0 | 2.0 | 1.6 |
| 4 | 1.0 | 2.0 | 1.4 |
| 4 | 3.0 | 2.0 | 1.4 |

The above data indicate that copper complexes with the cationic polymers of this invention are effective stabilizers of copper ions in cloudy, alkaline water.

The cationic polymers of this invention are also useful in dissolving "insoluble" salts of copper and nickel. A one percent by weight aqueous solution of polymer product 2 at 75° C. for one hour dissolves the amounts of cation from the insoluble salts as listed in Table 4. Excess amounts of the salts listed are added to the aqueous solution of polymer product 2. The results are expressed as the weight percent of metal in the resulting solution. The second value is the amount of the metal cation dissolved when the pH is adjusted to 1.0 with HCl, under the same conditions.

TABLE IV

| Salt | Percent metal in solution | Percent metal in solution, pH 1.0 |
|---|---|---|
| NiS | 0.13 | 0.13 |
| NiO | 0.008 | 0.03 |
| CuS | 0.02 | 0.02 |
| CuO | 0.05 | 0.28 |
| $CuFeS_2$ | <0.002 (Cu) | <0.002 |
| $NiFeS_2$ | <0.002 (Ni) | <0.002 |

Similar results are obtained with cobalt salts. For this purpose, the polymers are added stoichiometrically depending on the concentration of the metal ion desired in the aqueous solution.

Although the present invention has been described in detail, it is to be understood that the scope of the invention is limited only by the claims appended hereto.

What is claimed is:

1. A process for preparing a water-soluble cationic polymer comprising reacting by contacting (a) an ethylene dihalide and (b) bis(2-aminoethyl) sulfide, N-(2-(2-aminoethylthio)ethyl)ethylenediamine, 1,8 - diamino-3,6-dithiaoctane, 1,9-diamino-3,6-dithianonane, 1,10-diamino-3,7-dithiadecane, bis(aminophenyl) sulfide or bis(aminotolyl) sulfide and heating the mixture to a temperature sufficient to initiate an exothermic reaction.

2. The process defined by claim 1 wherein (a) is ethylene dichloride or ethylene dibromide.

3. The process defined by claim 1 wherein (b) is bis(2-aminoethyl) sulfide or N-(2-(2-aminoethylthio)ethyl)ethylenediamine.

4. The process defined by claim 3 wherein (a) is ethylene dichloride.

5. The product produced by the process defined by claim 1.

6. A water-soluble metal ion complex formed by the product of claim 1 and a polyvalent ion of copper, nickel or cobalt.

7. A water-soluble metal ion complex formed by the product of claim 3 and a polyvalent ion of copper, nickel or cobalt.

8. The complex defined in claim 6 wherein the polyvalent metal ion is of copper.

9. The complex defined in claim 7 wherein the polyvalent metal ion is of copper.

10. The method for increasing the solubility in aqueous solution of an insoluble Cu or Ni salt which consists of forming a complex between the metal ions and the polymer of claim 6 by adding said metallic salt to an aqueous solution of said polymer.

11. The method of claim 10 in which the metallic salt is selected from the group consisting of NiS, NiO, CuS, CuO, $CuFeS_2$, and $NiFeS_2$.

12. In the method of treating water with copper ions for the purpose of inhibiting and destroying undesirable aquatic growth, the improvement which consists of adding thereto a sufficient amount of a water-soluble copper ion complex to establish an effective concentration of copper ions in such waters, the complex being the reaction product of (1) from about 1 to 3 parts by weight of the water-soluble cationic polymer of claim 6, and (2) from about 3 to 1 parts by weight of copper in the form of a water-soluble copper salt.

References Cited

UNITED STATES PATENTS

| | | | |
|---|---|---|---|
| 2,271,378 | 1/1942 | Searle | 260—79.1 |
| 3,335,116 | 8/1967 | Rosenthal et al. | 260—79 |
| 3,362,996 | 1/1968 | Teumac | 260—583 |

DONALD E. CZAJA, *Primary Examiner.*

M. J. MARQUIS, *Assistant Examiner.*

U.S. Cl. X.R.

71—67; 210—59, 64; 260—79, 79.1, 583